(12) United States Patent
Furst

(10) Patent No.: US 10,862,333 B2
(45) Date of Patent: Dec. 8, 2020

(54) SOLAR AND PLUG AUTOMATIC RECHARGEABLE 12/24 VOLT BATTERY POWER BACKUP UNIT

(71) Applicant: Robert Furst, East Falmouth, MA (US)

(72) Inventor: Robert Furst, East Falmouth, MA (US)

( * ) Notice: Subject to any disclaimer, the term of this patent is extended or adjusted under 35 U.S.C. 154(b) by 281 days.

(21) Appl. No.: 15/904,723

(22) Filed: Feb. 26, 2018

(65) Prior Publication Data

US 2018/0248401 A1    Aug. 30, 2018

Related U.S. Application Data

(60) Provisional application No. 62/462,995, filed on Feb. 24, 2017.

(51) Int. Cl.
| | | |
|---|---|---|
| *H02J 7/00* | (2006.01) | |
| *H02J 9/06* | (2006.01) | |
| *H02J 3/32* | (2006.01) | |
| *H02J 13/00* | (2006.01) | |
| *H02S 40/32* | (2014.01) | |
| *H02J 7/35* | (2006.01) | |

(52) U.S. Cl.
CPC ............... *H02J 9/062* (2013.01); *H02J 3/32* (2013.01); *H02J 7/0031* (2013.01); *H02J 7/35* (2013.01); *H02J 13/0096* (2013.01); *H02S 40/32* (2014.12); *H02J 7/0013* (2013.01); *Y02B 10/70* (2013.01); *Y02B 70/30* (2013.01); *Y02B 90/20* (2013.01); *Y04S 20/12* (2013.01); *Y04S 20/242* (2013.01); *Y04S 20/248* (2013.01); *Y04S 40/126* (2013.01)

(58) Field of Classification Search
CPC ........ H02J 7/0055; H02J 7/022; H02J 7/0031; Y02T 10/7005; Y02T 90/121
See application file for complete search history.

(56) References Cited

U.S. PATENT DOCUMENTS

| | | | |
|---|---|---|---|
| 9,396,897 B1* | 7/2016 | Ademola | H01H 47/00 |
| 2006/0170218 A1* | 8/2006 | Grant | H02K 7/1815 |
| | | | 290/1 R |
| 2007/0019453 A1* | 1/2007 | Pierce | H01M 2/10 |
| | | | 363/107 |

* cited by examiner

*Primary Examiner* — Arun C Williams
(74) *Attorney, Agent, or Firm* — Bachman and LaPointe PC; George Coury

(57) ABSTRACT

A battery operated standby power system, including a microboard; at least two rechargeable batteries mounted to the microboard; a charger for selectively charging the at least two batteries; at least two, or dual, inverters, one inverter being assigned to each of the at least two batteries; a plurality of outlets, the outlets being configured to selectively deliver 120 VAC, 240 VAC and both 120 and 240 VAC from the batteries through the inverters.

5 Claims, 1 Drawing Sheet

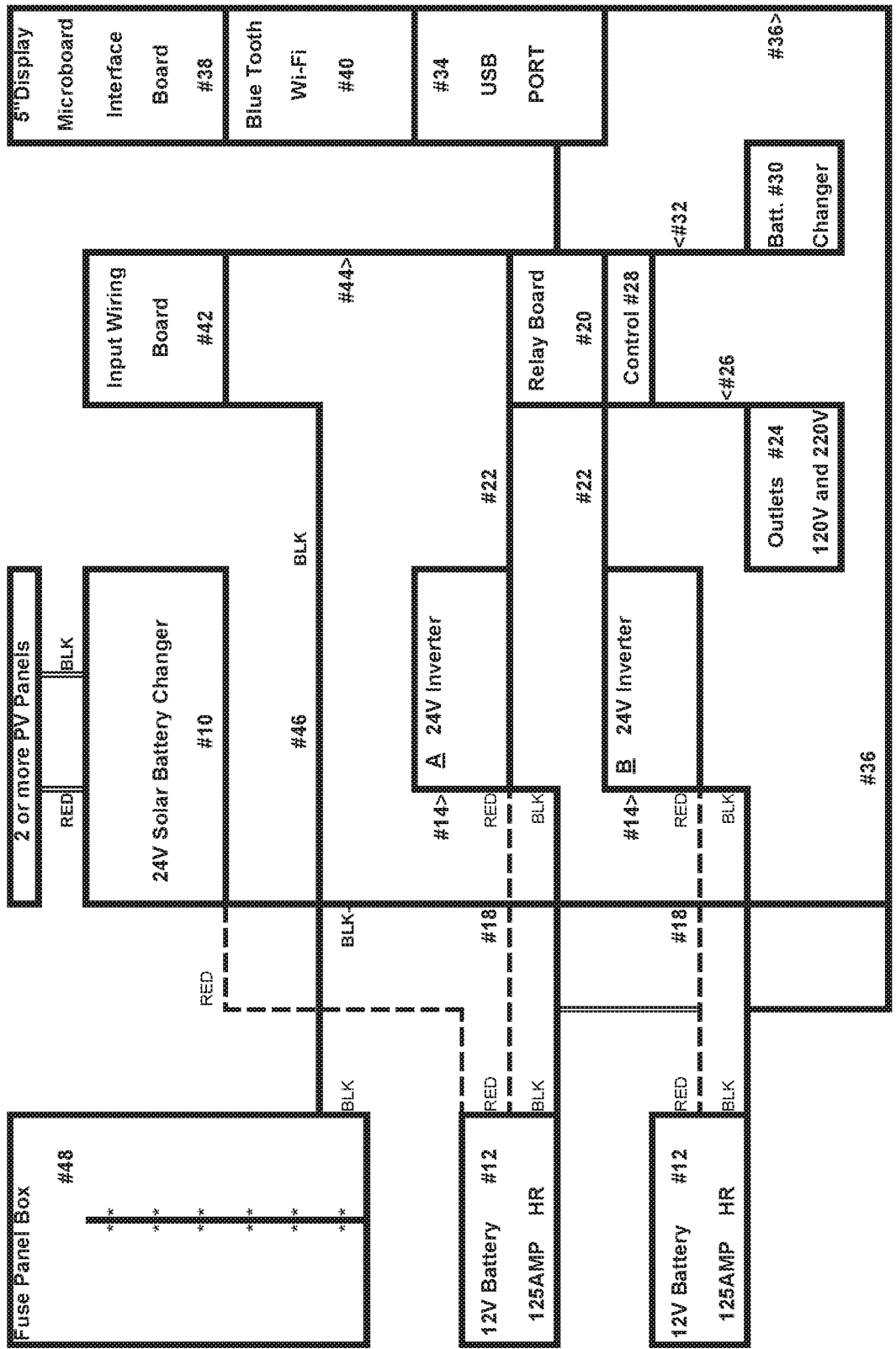

SOLAR AND PLUG AUTOMATIC RECHARGEABLE 12/24 VOLT BATTERY POWER BACKUP UNIT

CROSS REFERENCE TO RELATED APPLICATION

This is a non-provisional application which claims the benefit of provisional application Ser. No. 62/462,995 filed Feb. 24, 2017.

BACKGROUND OF THE INVENTION

The invention relates to a battery backup unit for providing emergency power during the need for same, for example during an interruption of normal power service.

Hydrocarbon fuel powered generators are frequently used to provide an emergency supply of power when normal grid-based power is unavailable due to either emergency conditions or, possibly, a remote location. These systems are certainly effective at generating power. However, they must be kept fueled, are noisy and generate potentially harmful atmospheric conditions.

As an alternative, battery systems have been provided which can maintain a charge from the normal grid-supplied power, and which can supply a temporary emergency supply of power when the grid-based supply of power is interrupted. Examples of this type of device are typical uninterrupted power source (UPS) devices used to provide emergency power to various electronics. These devices are effective at their intended uses as well. However, the utility of such devices is limited by a relatively short battery life, a constant drain on power from the grid to keep the battery charged, and the inability to charge the battery during an interruption of the normal grid-supplied power. Further, such devices are also limited in the types of devices which they can effectively power.

Given the above, the need remains for a backup power unit, or standby power system, which addresses the above deficiencies of known devices. It is therefore the primary focus of the present invention to meet these needs.

SUMMARY OF THE INVENTION

In accordance with the invention, the foregoing focus has developed a battery operated standby power system which comprises: a microboard; at least two rechargeable batteries mounted to the microboard; a charger for selectively charging the at least two batteries; at least two, or dual, sine wave inverters, one inverter being assigned to each of the at least two batteries; a plurality of outlets, the outlets being configured to selectively deliver 120 VAC, 240 VAC and both from the batteries through the dual inverters.

The system of the present invention can be maintained in a charged condition by either plugging into the normal grid-supplied power source such as a wall 120V outlet, hard-wiring the system of the present invention into the grid-supplied power system of a particular location, and/or connecting the standby power system of the present invention to a source of solar recharging energy for the batteries or to a different renewable source of energy such as a wind driven power machine or the like. It should readily be appreciated that the system in accordance with the present invention provides backup power for a wide variety of electric appliances, with no carbon monoxide, no noise and no fumes. Thus, the apparatus and system according to the invention provide backup power that is clean power.

Further, because the system of the present invention has two rechargeable batteries, typically two 12 V batteries, connected in parallel to at least two, or dual, inverters, the batteries can be used to provide 120 VAC suitable for use by most household electronics, or 240 VAC for use by larger electronic devices, or both.

Still further, the system of the present invention is not exclusively dependent on power from the grid to keep the batteries charged.

Other objects and advantages will appear hereinbelow.

BRIEF DESCRIPTION OF THE DRAWINGS

A detailed description of preferred embodiments of the present invention follows, with reference to the attached drawings, wherein:

FIG. 1 is a schematic illustration of a system in accordance with the present invention.

DETAILED DESCRIPTION

FIG. 1 shows a system 10 for providing standby power from batteries 12. Batteries 12 are connected to inverters 14 by way of lines 18, to provide 120 V output through lines 22 to a relay board 20. Inverters 14 as shown in FIG. 1 can be associated with inverter mother boards, each of which may be communicated with a control card and an inverter control card, or configured differently so as to provide the function described herein. Relay board 20 is communicated to outlets 24 through lines 26 such that the 120V output from inverters 14 can be conveyed to a plurality of outlets at 120 VAC, as desired, and also so that this output can be combined to produce a 240 VAC output through a preferably single outlet of outlets 24. Relay board 20 is connected to outlets 24 though lines 26, and is associated with a relay daughter board or control board 28.

A battery charger 30 is also communicated with relay board 20 through lines 32 as shown in FIG. 1, and battery charger 30 can be used to recharge batteries 12 as needed, when batteries are not in use. As mentioned above, battery charger 30 can be connected to receive power from normal grid-supply of power. Alternatively, a solar battery charger 31 can be connected to a source of solar power, for example two or more solar panels 33 mounted at or near the location of system 10. Battery charger 30 is typically connected to relay board 20 through lines 32. In further accordance with the invention, system 10 preferably includes USB charging ports 34 which can be communicated back through to battery charger 30 as well as batteries 12 by lines 36. USB charging ports 34, preferably four of them, can be directly operated by batteries 12 through lines 36, and the component which houses and provides charging ports 34 can also advantageously be provided with battery monitor and control functions which will be discussed further below.

In connection with the control functions, a microboard interface 38 can be provided, and such an interface is schematically illustrated in FIG. 1. This interface would have a display such as a touch-pad or LED touch screen, which allows users to make input as needed to operate system 10 in accordance with their present needs. Microboard interface 38 can advantageously be provided with wireless communication transmitter/receiver structures 40 for example for facilitating Wi-Fi and/or Bluetooth types of communication. This type of wireless communication advantageously allows system 10 to be controlled from a remote location by an operator of a device which communicates with wireless communication/receiver.

An input wiring board 42 can be communicated with relay board 20 through lines 44, and can also be communicated through lines 46 with a circuit breaker or fuse box 48, panel which functions as a surge protector board and can also be configured as a control board.

A control unit can advantageously be incorporated into one or more of the components of the system 10 which is illustrated in FIG. 1 such that outlets 24 are properly configured to provide suitable levels of power through some outlets and to inhibit other outlets, and also to control battery usage and produce signals indicating that battery charge has diminished certain levels. The control unit can be provided with a control interface of any type known to a person skilled in the art for allowing control of the apparatus. The control interface can include an on/off switch or control for each outlet, and may also include a duration setting for setting duration of an "on" setting at one or more outlets.

In accordance with the invention, the system can be programmed to power one or more items through the different outlets 24 of system 10 for specific amounts of time. In this way, the power available from system 10 can be carefully managed to provide as much useful function as possible, for example during an emergency interruption of normal grid-based power.

The system in accordance with the present invention can be permanently installed, through hard-wiring as discussed above, or can be a portable device which can be plugged into any wall outlet for charging and keeping charged batteries 12 for use when necessary. It is advantageous to keep system 10 substantially free of the grid, and thus, it may be desired to connect even a portable device to something other than the grid, such as solar or wind based energy.

With the system as outlined herein with a grid-based system, the batteries will automatically recharge when power is restored, assuming that there has been an interruption in the grid-supplied power, or alternatively the batteries can be recharged through solar panels even during the interruption of power.

Through proper cycling times, as possible, various different functions can be maintained for extended periods of time even during an interruption of power. For example, with proper management, a typical oil or gas heating system can be operated to keep a 2000 ft$^2$ home at 65° C., using two 125 amp hr batteries and the system of the present invention can operate such a system for approximately 48 hours. A typical air conditioning 10K BTU window system can be maintained in continuous use for about 3-5 hours. A refrigerator can be run for 10 minutes per hour and kept running in this fashion for 50 hours or more, thus greatly increasing the chance that food and other perishable items will not suffer.

In one illustrative example, the system can be provided with at least 5 outlets, and can be operated in a first mode wherein 120 VAC is delivered to four of the at least five outlets and the fifth of the at least five outlets is inactive; a second mode wherein the four outlets are inactive and 240 VAC is delivered to the fifth of the at least five outlets; and a third mode wherein 120 VAC is delivered to at least some of the four outlets and 240 VAC is delivered to the fifth outlet. These modes can then be selected to balance between providing the most urgent needs for power and maximizing battery life.

It should readily be appreciated that the system in accordance with the present invention meets the objective set forth above, and would be ideally put to use in a wide variety of applications to produce clean power for backup operation of a numerous electrical needs.

It is to be understood that the invention is not limited to the illustrations described and shown herein, which are deemed to be merely illustrative of the best modes of carrying out the invention, and which are susceptible to modification of form, size, arrangement of parts and details of operation. The invention, rather, is intended to encompass all such modifications which are within its spirit and scope as defined by the claims.

What is claimed is:

1. A battery operated standby power system, comprising:
   a microboard;
   at least two 12V rechargeable batteries electrically connected to the microboard;
   a charger for selectively charging the at least two batteries;
   at least two inverters, one inverter being assigned to each of the at least two batteries;
   a plurality of outlets, the outlets being configured to selectively deliver 120 VAC, 240 VAC and both 120V and 240 VAC from the batteries through the at least two inverters, wherein the outlets include at least 5 outlets, and wherein the system can be operated in a first mode wherein 120 VAC is delivered to four of the at least five outlets and the fifth of the at least five outlets is inactive; a second mode wherein the four outlets are inactive and 240 VAC is delivered to the fifth of the at least five outlets; and a third mode wherein 120 VAC is delivered to at least some of the four outlets and 240 VAC is delivered to the fifth outlet.

2. The system of claim 1, wherein the charger can be connected to a solar source of charging, an A/C source of charging, or both.

3. The system of claim 1, further comprising a control unit communicated with circuitry connecting the inverters to the outlets, and a control interface for the control unit, mounted on the system.

4. The system of claim 1, further comprising a wireless communication transmitter/receiver associated with the control unit to allow remote control of the system.

5. The system of claim 3, wherein the control interface includes an on/off for each outlet, and a duration setting for setting duration of an on setting at an outlet.

* * * * *